United States Patent
Rong et al.

(10) Patent No.: US 10,508,196 B2
(45) Date of Patent: Dec. 17, 2019

(54) RUBBER FORMULATION WITH ENHANCED FLEX FATIGUED RESISTANCE

(71) Applicant: ContiTech Techno-Chemie GmbH, Karben (DE)

(72) Inventors: Guangzhuo Rong, Hudson, OH (US); Thomas George Burrowes, North Canton, OH (US); Prem Thapa, Fairlawn, OH (US)

(73) Assignee: CONTITECH TECHNO-CHEMIE GMBH, Karben (DE)

( * ) Notice: Subject to any disclaimer, the term of this patent is extended or adjusted under 35 U.S.C. 154(b) by 126 days.

(21) Appl. No.: 15/744,199

(22) PCT Filed: Jun. 29, 2016

(86) PCT No.: PCT/US2016/040024
§ 371 (c)(1),
(2) Date: Jan. 12, 2018

(87) PCT Pub. No.: WO2017/019237
PCT Pub. Date: Feb. 2, 2017

(65) Prior Publication Data
US 2018/0208756 A1    Jul. 26, 2018

Related U.S. Application Data

(60) Provisional application No. 62/197,652, filed on Jul. 28, 2015.

(51) Int. Cl.
| | |
|---|---|
| *C08L 23/16* | (2006.01) |
| *C08K 3/02* | (2006.01) |
| *C08L 7/00* | (2006.01) |
| *C08L 9/00* | (2006.01) |
| *C08L 23/32* | (2006.01) |

(52) U.S. Cl.
CPC ................ *C08L 23/16* (2013.01); *C08K 3/02* (2013.01); *C08L 7/00* (2013.01); *C08L 9/00* (2013.01); *C08L 23/32* (2013.01)

(58) Field of Classification Search
CPC .................................. C08L 23/16; C08L 7/00
USPC .......................................................... 524/526
See application file for complete search history.

(56) References Cited

U.S. PATENT DOCUMENTS

| | | | | |
|---|---|---|---|---|
| 2013/0333817 A1* | 12/2013 | Burlett | .................. | B60C 29/005 152/427 |
| 2016/0215131 A1* | 7/2016 | Adkinson | ............... | C08L 23/26 |

FOREIGN PATENT DOCUMENTS

| | | | |
|---|---|---|---|
| CN | 104292511 A | * | 1/2015 |
| WO | 2014028641 A1 | | 2/2014 |
| WO | 2015032000 A1 | | 3/2015 |

OTHER PUBLICATIONS

Translation of CN 104292511, Jan. 21, 2015. (Year: 2015).*
International Search Report dated Sep. 13, 2016 of international application PCT/US2016/040024 on which this application is based.

* cited by examiner

*Primary Examiner* — Hui H Chin
(74) *Attorney, Agent, or Firm* — David L. Cate; Gregory Adams

(57) ABSTRACT

A rubber composition is provided which exhibits a high level of flex fatigue resistance, ozone resistance, building tack, bondability to diene based rubbers, and low temperature resistance. The rubber composition contains EPDM rubber, natural rubber, high cis-1,4-polybutadiene rubber, and from 5 phr to 30 phr of a butyl ionomer.

17 Claims, No Drawings

RUBBER FORMULATION WITH ENHANCED FLEX FATIGUED RESISTANCE

RELATED APPLICATION INFORMATION

This application is a National Stage entry from international patent application PCT/US2016/040024, filed Jun. 29, 2016, designating the United States and claiming priority from U.S. Provisional Patent Application No. 62/197,652, filed Jul. 28, 2015, and the entire content of both applications is incorporated herein by reference.

FIELD

The field to which the disclosure generally relates is air springs, and more particularly to improved air springs based upon rubber compositions providing improved fatigue resistance, ozone resistance, building tack, bondability, and low temperature resistance.

BACKGROUND

This section provides background information to facilitate a better understanding of the various aspects of the disclosure. It should be understood that the statements in this section of this document are to be read in this light, and not as admissions of prior art.

Rubbery polymers are used in manufacturing a wide variety of manufactured goods, including tires, hoses, power transmission belts, conveyor belts, windshield wiper blades, bellows and rolling lobes for air springs and the like. In many of these applications it is important for the rubbery polymer to exhibit good flex fatigue resistance to provide the product with a long service life as well as an array of additional physical properties and chemical characteristics. To attain the combination of properties needed in a specific application blends of two or more types of rubbers and a wide variety of rubber chemicals are typically utilized in modern rubber formulations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some aspects of the disclosure are based upon the discovery that a high level of flex fatigue resistance, ozone resistance, building tack, bondability to diene based rubbers, and low temperature resistance can be attained by blending high-cis-1,4-polybutadiene rubber, natural rubber, and a butyl ionomer into ethylene-propylene-diene monomer rubber (EPDM). To attain the desired combination of properties it is critical for the rubber formulation to include the natural rubber, the high-cis-1,4-polybutadiene rubber, and the butyl ionomer as well as the EPDM rubber.

The disclosure also relates to rubber composition which exhibits a high level of flex fatigue resistance, ozone resistance, building tack, bondability to diene based rubbers, and low temperature resistance which is comprised of EPDM rubber, natural rubber, high cis-1,4-polybutadiene rubber, and from 5 phr to 30 phr of a butyl ionomer. The rubber formulations are typically cured with a combination of sulfur and peroxide curatives to attain a highly desirable combination of physical and chemical properties.

The rubber formulations according to the disclosure also typically include from about 30 phr to 50 phr of carbon black. The carbon black is preferably carcass grade carbon black, such as an N400 grade, N500 grade, N600 grade or N700 grade of carbon black. For instance, N550 carbon black is highly preferred for utilization in the flex fatigue resistant rubber formulations according to some aspects of the disclosure.

The rubber formulations according to the disclosure are, in some aspects, of particular value in manufacturing cylindrical shaped airtight rubber articles having straight or curved walls. Such cylindrical shaped airtight rubber articles can be comprised of an outer wall which is comprised of the rubber composition of the disclosure, an inner wall which is comprised of a rubbery polymer, and at least one rubberized fabric reinforcement layer which is situated between the outer wall and the inner wall. In another embodiment according to the disclosure, the inner wall of the cylindrical shaped airtight rubber article can also be comprised of the rubber formulation of the disclosure. In some specific embodiments, the cylindrical shaped airtight rubber article can be in the form of a bellows, a rolling lobe, or a sleeve for an air spring.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The rubber formulations according to the disclosure may exhibit a high level of flex fatigue resistance, ozone resistance, building tack, bondability to diene based rubbers, and low temperature resistance and are comprised of EPDM rubber, natural rubber, high cis-1,4-polybutadiene rubber, and from 5 phr to 30 phr of a butyl ionomer (the term "phr" denotes parts by weight per 100 parts by weight of rubber). In rubber compositions of the disclosure, the EPDM rubber is typically present at a level within the range of 35 phr to 65 phr, with the high cis-1,4-polybutadiene rubber being present at a level in the range of 5 phr to 25 phr, and with the natural rubber being present at a level within the range of 10 phr to 50 phr. The butyl ionomer is typically present at a level within the range of 5 phr to 25 phr and is more typically present at a level within the range of 5 phr to 20 phr. The butyl ionomer may be present in the rubber formulation at a level within the range of 5 phr to 15 phr, and in some cases, be present at a level which is within the range 8 phr to 12 phr.

In one embodiment according to the disclosure, the EPDM rubber is present at a level within the range of 40 phr to 60 phr, the high cis-1,4-polybutadiene rubber is present at a level in the range of 10 phr to 20 phr, and the natural rubber is present at a level within the range of 25 phr to 45 phr. In another aspect, the EPDM rubber is present at a level within the range of 45 phr to 55 phr, the high cis-1,4-polybutadiene rubber is present at a level in the range of 10 phr to 20 phr, and the natural rubber is present at a level within the range of 30 phr to 40 phr.

Rubber formulation embodiments according to the disclosure typically contain reinforcing fillers, such as carbon black, for example. Exceptional results can be attained in cases where the carbon black is a carcass grade of carbon black, such as an N400 grade, N500 grade, N600 grade or N700 grade of carbon black. For instance, a highly preferred carbon black is N550 carbon black. The carbon black will typically be included in the rubber formulation at a level which is within the range of about 20 phr to about 80 phr. The carbon black will preferably be incorporated into the rubber formulation at a level which is within the range of about 30 phr to about 50 phr of carbon black. Other reinforcing fillers, such as silica, clay, talc, or lignin, can also be included in the rubber formulations of the disclosure addition to carbon black. Such additional reinforcing fillers will typically be included in the rubber formulations at a level which is within the range of about 5 phr to about 50 phr and are generally included at a level which is within the range of about 10 phr to about 25 phr.

The rubber compositions according to the disclosure will normally be cured with a combination of a sulfur vulcanizing agent and peroxide curatives to attain optimal results. Some representative examples of suitable sulfur vulcanizing agents that can be used include elemental sulfur (free sulfur) or sulfur-donating-vulcanizing agents, for example, an amine disulfide, polymeric polysulfide or sulfur olefin adducts. Preferably, the sulfur-vulcanizing agent is elemental sulfur. The amount of sulfur vulcanizing agent will vary depending on the remaining ingredients, and the particular type of sulfur vulcanizing agent that is used. Generally speaking, the level of the sulfur vulcanizing agent utilized will be within the range of about 0.1 phr to about 8 phr. It is typically preferred for the level of the sulfur vulcanizing agent used to be within the range of about 1 phr to about 3 phr.

The peroxide curatives which can be used in the practice of some embodiments of the disclosure, are those which are generally suitable for curing EPDM. Some representative examples of organic peroxides which can be used include, but not limited to, dicumyl peroxide, t-butyl perbenzoate, di-t-butyl peroxide, 2,5-dimethyl-2,5-di-t-butylperoxyhexane, alpha-alpha'-bis(t-butylperoxy) diisopropylbenzene, methylethyl ketone peroxide, cyclohexanone peroxide, cumene hydroperoxide, pinane hydroperoxide, p-menthane hydroperoxide, t-butyl hydroperoxide, di-t-butyl peroxide, and the like. Dicumyl peroxide and alpha-alpha'-bis(t-butylperoxy) diisopropylbenzene are highly preferred peroxide compounds. Cure-effective amounts of organic peroxide are typically from about 0.2 phr to about 10 phr. Preferred levels of organic peroxide are typically from about 0.4 phr to about 6 phr. The organic peroxide is typically not added neat and is beneficially pre-dispersed in a binder, such as a filler or a polymeric material.

The EPDM rubber which is employed in the rubber formulations of the disclosure will typically contain at least 6 weight percent of a bound diene monomer, such as 2-ethyldiene-5-norbornene (ENB), dicyclopentadiene (DCPD), and 1,4-hexadiene (HD). The EPDM rubber will more typically contain at least 8 weight percent bound diene monomer. In most cases the EPDM rubber will be extended with a paraffinic oil and will have a Mooney ML1+4 viscosity at 125° C. which is within the range of 40 to 55. The EPDM rubber will generally have a bound ethylene content which is within the range of 50 to 75 weight percent.

The butyl ionomer utilized in the rubber formulations according to the disclosure is typically the reaction product of a halobutyl rubber and an organic phosphide. The halobutyl rubber will typically be a bromobutyl rubber which upon reaction with the organic phosphide forms a bromobutyl ionomer. In any case, the butyl ionomer will typically have ionic moieties of the structural formula: $-CH_3-P^+R_3Br^-$ affixed to the backbone thereof. In these ionic moieties the R groups will typically be hydrocarbyl groups, such as an alkyl group. Lanxess X-Butyl™ I4565 P bromobutyl ionomer rubber is a commercially available butyl ionomer that can be utilized in the rubber formulations of the disclosure. It is available from Lanxess AG, Kennedyplatz 1, 50569 Cologne, Germany.

The rubber formulations according to the disclosure can be utilized in manufacturing a wide variety of rubber articles and are particularly useful in manufacturing rubber products where improved flex fatigue resistance is needed without compromising ozone resistance, building tack, bondability to diene based rubbers, or low temperature performance characteristics. For instance, the rubber formulations can be used in manufacturing tires, hoses, power transmission belts, conveyor belts, windshield wiper blades, vibration reduction pads, bellows for air springs, rolling lobes for air springs and the like.

The flex fatigue resistant rubber formulation according to the disclosure is extremely well suited for use in manufacturing cylindrical shaped airtight rubber article having straight or curved walls. For instance such a flex fatigue resistant cylindrical shaped airtight rubber article can be comprised of an outer wall which is comprised of the rubber composition according to the disclosure, an inner wall which is comprised of a rubbery polymer, and at least one rubberized fabric reinforcement layer which is situated between the outer wall and the inner wall. In one embodiment, the inner wall of the flex fatigue resistant cylindrical shaped airtight rubber article can also be comprised of the rubber compositions according to the disclosure. In other specific embodiments of the disclosure the flex fatigue resistant cylindrical shaped airtight rubber article can be in the form of a bellows, a rolling lobe or a sleeve for an air spring. Such an air spring will, of course, also include a piston and a top plate which are connected by the flex fatigue resistant cylindrical shaped airtight rubber article in an air tight manner to form the air spring.

Some aspects of the disclosure are illustrated by the following examples that are merely for the purpose of illustration and are not to be regarded as limiting the scope of the invention or the manner in which it can be practiced. Unless specifically indicated otherwise, parts and percentages are given by weight.

EXAMPLES

In this series of experiments rubber formulations which contained an EPDM rubber, natural rubber, and high-cis-1,4-polybutadiene rubber were made as a control formulation and compared to an identical formulation which further contained a bromobutyl ionomer rubber (experimental formulation). The base rubber formulation used in this series of experiments was made by mixing 87.5 phr of EPDM rubber, 15 phr of Budene® 1207 high cis-1,4-polybutadiene rubber, 35 phr of natural rubber, 40 phr of N550 carbon black, 0.8 phr of a paraffin wax, 1.3 phr of a crystalline wax, 0.15 phr of a peptizer (50% active), 6 phr of 6-PPD antioxidant, 3 phr of Struktol HD 55 processing aid, 4.31 phr of zinc oxide, 1.5 stearic acid, 15 phr of clay filler, and 1 phr of ZMTI antioxidant in a non-productive stage and then further blending 2.12 phr of insoluble sulfur (65% active), 1.07 parts of Polystay® 100 antiozonant, 1.07 phr of dicumyl peroxide (DCP) (60% active), and 0.92 phr of N-tert-butyl-2-benzothiazyl sulfenamide (TBBS) in a productive mixing stage. In the rubber formulations which further contained the bromobutyl ionomer rubber, 10 phr of Lanxess X-Butyl™ I4565 P bromobutyl ionomer rubber was added in the non-productive mixing stage. Both of the rubber formulations were cured and tested for original physical properties and properties after being oven aged at for 70 hours at a temperature of 212° F. (100° C.). The properties measured are reported in Table 1.

TABLE 1

|  | Control Formulation | Experimental Formulation (with 10 phr of bronobutyl ionomer rubber) |
|---|---|---|
| Original Properties |  |  |
| Tensile Strength | 1835 psi (12.65 MPa) | 1916 psi (13.21 MPa) |
| Elongation to Break | 652% | 668% |

TABLE 1-continued

|  | Control Formulation | Experimental Formulation (with 10 phr of bronobutyl ionomer rubber) |
|---|---|---|
| 100% Modulus | 210 psi (1.45 MPa) | 210 psi (1.45 MPa) |
| Shore A Hardness | 49 | 46 |
| Die B Tear Strength | 185 lb/inch (3.30 kg/mm) | 208 lb/inch (3.71 kg/mm) |
| Die C Tear Strength | 135 lb/inch (2.41 kg/mm) | 130 lb/inch (2.32 kg/mm) |
| Air Oven Aged Properties |  |  |
| Tensile Strength | 1525 psi (10.51 MPa) | 1497 psi (10.32d MPa) |
| Elongation to Break | 565% | 575% |
| 100% Modulus (psi) | 294 psi (2.03 MPa) | 253 psi (1.74 MPa) |
| Shore A Hardness | 53 | 50 |
| Change in Tensile Strength | −17% | −22% |
| Change in Elongation to Break | −13% | −14% |
| Change in 100% Modulus | 40% | 20% |
| Change in Shore A Hardness | 4 | 4 |

As can be seen by reviewing Table 1, the physical characteristics of the control formulation were not changed in an unacceptable manner by the addition of the Lanxess X-Butyl™ I4565 P bromobutyl ionomer rubber. However, as can be seen in Table 2, the flex fatigue resistance of the experimental rubber formulation made including the Lanxess X-Butyl™ I4565 P bromobutyl ionomer rubber were improved significantly. Table 2 reports the crack length determined after the reported number of cycles using Texus Flex (29% strain) testing and DeMattia Flex testing.

TABLE 2

|  | Control Formulation | Experimental Formulation (with 10 phr of bronobutyl ionomer rubber) |
|---|---|---|
| Texus Flex (29% strain) |  |  |
| 500,000 cycles | 0.26 inch (6.6 mm) | 0.21 inch (5.3 mm) |
| 1,000,000 cycles | 0.42 inch (10.7 mm) | 0.26 inch (6.6 mm) |
| 1,500,000 cycles | 0.58 inch (14.7 mm) | 0.32 inch (8.1 mm) |
| 2,000,000 cycles | 0.73 inch (18.5 mm) | 0.36 inch (9.1 mm) |
| 2,500,000 cycles | 0.80 inch (20.3 mm) | 0.38 inch (9.7 mm) |
| 3,000,000 cycles | 0.90 inch (22.9 mm) | 0.44 inch (11.2 mm) |
| 3,500,000 cycles | 0.95 inch (24.1 mm) | 0.47 inch (11.9 mm) |
| 4,000,000 cycles | 0.97 inch (24.6 mm) | 0.50 inch (12.7 mm) |
| DeMattia Flex |  |  |
| 500,000 cycles | 0.61 inch (15.6 mm) | 0.22 inch (5.6 mm) |
| 1,000,000 cycles | 0.67 inch (17.0 mm) | 0.26 inch (6.6 mm) |
| 1,500,000 cycles | 0.76 inch (19.2 mm) | 0.26 inch (6.7 mm) |
| 2,000,000 cycles | 0.76 inch (19.2 mm) | 0.30 inch (7.6 mm) |
| 2,500,000 cycles | 0.76 inch (19.2 mm) | 0.31 inch (7.9 mm) |
| 3,000,000 cycles | 0.76 inch (19.3 mm) | 0.35 inch (8.9 mm) |

As can be seen from Table 2, the crack length measured after every cycle duration was significantly less for the experimental formulation according to the disclosure, than it was in the control formulation. These experiments accordingly show by both Texus flex testing and by DeMattia flex testing that flex fatigue resistance was greatly improved by including the halobutyl ionomer rubber in the rubber formulations tested.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A rubber composition comprising EPDM rubber, natural rubber, high cis-1,4-polybutadiene rubber, and from 5 phr to 30 phr of a butyl ionomer, wherein the EPDM rubber is present at a level within the range of 45 to 55 phr, wherein the high cis-1,4-polybutadiene rubber is present at a level in the range of 10 phr to 20 phr, and wherein the natural rubber is present at a level within the range of 30 to 40 phr.

2. The rubber composition according to claim 1 wherein the butyl ionomer is present at a level within the range of 5 to 25 phr.

3. The rubber composition according to claim 1 wherein the butyl ionomer is present at a level within the range of 5 to 20 phr.

4. The rubber composition according to claim 1 wherein the butyl ionomer is present at a level within the range of 5 to 15 phr.

5. The rubber composition according to claim 1 wherein the butyl ionomer is present at a level within the range of 8 to 12 phr.

6. The rubber composition according to claim 1 wherein the composition is further comprised of 30 to 50 phr of carbon black.

7. The rubber composition according to claim 6 wherein the carbon black is carcass grade carbon black.

8. The rubber composition according to claim 7 wherein the carcass grade carbon black is selected from the group consisting of N400 grades, N500 grades, N600 grades and N700 grades of carbon blacks.

9. The rubber composition according to claim 7 wherein the carcass grade carbon black is N550 carbon black.

10. The rubber composition according to claim 1 wherein the rubber composition is cured with a combination of sulfur and peroxide curatives.

11. The rubber composition according to claim 1 wherein the EPDM rubber includes at least 6 weight percent bound diene monomer.

12. The rubber composition according to claim 1 wherein the EPDM rubber is extended with a paraffinic oil, and wherein the EPDM rubber has a bound ethylene content which is within the range of 50 to 75 weight percent.

13. The rubber composition according to claim 12 wherein the EPDM rubber has a Mooney ML1+4 viscosity at 125° C. which is within the range of 40 to 55.

14. A cylindrical shaped airtight rubber article having straight or curved walls wherein the article comprises a rubber composition comprising EPDM rubber, natural rubber, high cis-1,4-polybutadiene rubber, and from 5 phr to 30 phr of a butyl ionomer, wherein the EPDM rubber is present at a level within the range of 45 to 55 phr, wherein the high cis-1,4-polybutadiene rubber is present at a level in the range of 10 phr to 20 phr, and wherein the natural rubber is present at a level within the range of 30 to 40 phr.

15. A cylindrical shaped airtight rubber article having straight or curved walls, wherein the article comprises an outer wall comprising a rubber composition comprising EPDM rubber, natural rubber, high cis-1,4-polybutadiene rubber, and from 5 phr to 30 phr of a butyl ionomer, wherein the EPDM rubber is present at a level within the range of 45 to 55 phr, wherein the high cis-1,4-polybutadiene rubber is present at a level in the range of 10 phr to 20 phr, and wherein the natural rubber is present at a level within the range of 30 to 40 phr, and wherein the article further comprises an inner wall which is comprised of a rubbery polymer and at least one rubberized fabric reinforcement layer situated between the outer wall and the inner wall.

16. The cylindrical shaped airtight rubber article according to claim 15 wherein the inner wall is comprised of a rubber composition comprising EPDM rubber, natural rubber, high cis-1,4-polybutadiene rubber, and from 5 phr to 30 phr of a butyl ionomer.

17. The cylindrical shaped airtight rubber article according to claim 15 wherein the article is in the form of a bellows, a rolling lobe or a sleeve.

* * * * *